United States Patent
Frazelle et al.

(10) Patent No.: US 7,352,368 B2
(45) Date of Patent: Apr. 1, 2008

(54) COMPUTER-IMPLEMENTED SYSTEM AND METHOD FOR DISPLAYING THREE-DIMENSIONAL IMAGES HAVING ASSOCIATED METADATA

(75) Inventors: R. Allen Frazelle, Cary, NC (US); Scott C. Hennes, Durham, NC (US); Paul W. Layne, Cary, NC (US)

(73) Assignee: SAS Institute Inc., Cary, NC (US)

( * ) Notice: Subject to any disclaimer, the term of this patent is extended or adjusted under 35 U.S.C. 154(b) by 186 days.

(21) Appl. No.: 10/837,811

(22) Filed: May 3, 2004

(65) Prior Publication Data
US 2005/0243083 A1 Nov. 3, 2005

(51) Int. Cl.
*G06T 15/00* (2006.01)
*G09G 5/00* (2006.01)
(52) U.S. Cl. .................................. 345/419; 345/619
(58) Field of Classification Search ................ None
See application file for complete search history.

(56) References Cited

U.S. PATENT DOCUMENTS

| | | | |
|---|---|---|---|
| 5,708,764 A * | 1/1998 | Borrel et al. ................ | 345/419 |
| 5,721,851 A | 2/1998 | Cline et al. | |
| 5,805,170 A * | 9/1998 | Burch ......................... | 345/619 |
| 6,008,814 A * | 12/1999 | Baldwin et al. ............. | 345/427 |
| 6,341,178 B1 * | 1/2002 | Parker ......................... | 382/243 |
| 6,362,817 B1 | 3/2002 | Powers et al. | |
| 6,363,404 B1 * | 3/2002 | Dalal et al. .................. | 715/513 |
| 6,580,823 B1 | 6/2003 | Englefield et al. | |
| 6,680,730 B1 * | 1/2004 | Shields et al. .............. | 345/169 |
| 6,978,418 B1 * | 12/2005 | Bain et al. ................. | 715/501.1 |
| 7,171,627 B2 * | 1/2007 | Sawatari ..................... | 715/848 |
| 2001/0030651 A1 | 10/2001 | Doyle | |
| 2002/0035728 A1 * | 3/2002 | Fries ............................ | 725/68 |
| 2004/0119759 A1 * | 6/2004 | Barros ......................... | 345/853 |

OTHER PUBLICATIONS

Wei-Ying Ma and B. S. Manjunath, "EdgeFlow: A Technique for Boundary Detection and Image Segmentation", IEEE Transactions on Image Processing, vol. 9, No. 8, Aug. 2000.*
3DML Tutorial, printout located on http://xuriel.com/docs/3dml_tutorial.html, also posted on http://www.flatland.com/, last updated Feb. 28, 2003.*

* cited by examiner

*Primary Examiner*—Ulka Chauhan
*Assistant Examiner*—Daniel F Hajnik
(74) *Attorney, Agent, or Firm*—Jones Day

(57) ABSTRACT

Computer-implemented systems and methods for displaying an object having three-dimensional characteristics on a user interface Metadata and shape data related to a three-dimensional object are received. The shape data defines the three-dimensional object in a three-dimensional coordinate format. Computer instructions are generated that define region(s) of the object in a two-dimensional format. The instructions include the metadata and allow a user to access metadata associated with the image being displayed to a user.

25 Claims, 18 Drawing Sheets

| METADATA INDEX | DATA |
|---|---|
| | THOMAS |
| 1 | TIMOTHY |
| 2 | ADRIENE |
| 3 | ASHLEY |
| 4 | KAILA |
| 5 | MADELINE |
| 6 | SEAN |
| 7 | TBA |
| 8 | |

Fig. 8

| DATA | METADATA INDEX | METADATA |
|---|---|---|
| THOMAS | 1 | NAME: THOMAS   AGE: 19 (22.35%) |
| TIMOTHY | 2 | NAME: TIMOTHY  AGE: 9 (10.59%) |
| ADRIENE | 3 | NAME: ADRIENE  AGE: 9 (10.59%) |
| ASHLEY | 4 | NAME: ASHLEY   AGE: 9 (10.59%) |
| KAILA | 5 | NAME: KAILA    AGE: 9 (10.59%) |
| MADELINE | 6 | NAME: MADELINE AGE: 9 (10.59%) |
| SEAN | 7 | NAME: SEAN     AGE: 14 (16.47%) |
| TBA | 8 | NAME: TBA      AGE: 7 (8.24%) |

COMPUTER-IMPLEMENTED SYSTEM AND METHOD FOR DISPLAYING THREE-DIMENSIONAL IMAGES HAVING ASSOCIATED METADATA

TECHNICAL FIELD

The present invention relates generally to displaying images and more particularly to generating images for display on computer-human interfaces.

BACKGROUND AND SUMMARY

Web browsers handle many different types of images, and may allow information associated with the images to be displayed to the user. As an illustration, a user can use a pointing device to mouse over a portion of an image. While mousing over the image, tip information or other type of information that may be associated with the image is displayed to the user. However, during the generation of an image for use with a web browser, such useful information as well as other information associated with an image may be lost. In accordance with the teachings provided herein, systems and methods are disclosed herein to address this and other issues related to handling images.

As an example of a system and method disclosed herein, metadata and shape data related to a three-dimensional object are received. The shape data defines the three-dimensional object in a three-dimensional coordinate format. Computer instructions are generated that define region(s) of the object in a two-dimensional format. The instructions include the metadata and allow a user to access metadata associated with the image being displayed to a user.

BRIEF DESCRIPTION OF THE DRAWINGS

FIGS. 6-13 depict an operational scenario with respect to handling a three-dimensional pie chart;

DETAILED DESCRIPTION

Figure 1:
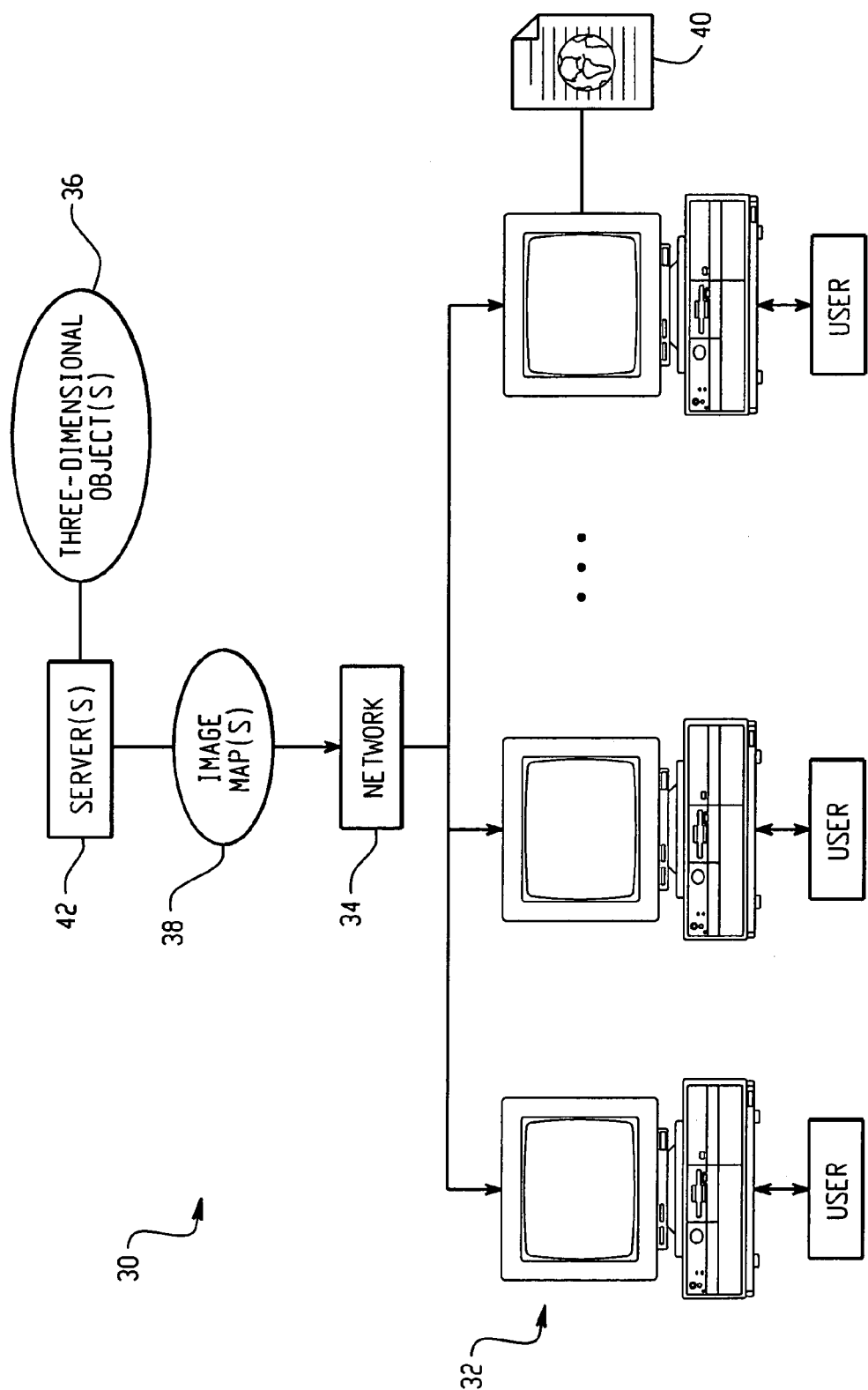
FIG. 1 is a block diagram depicting a computer-implemented system for delivering images and data for display upon user computers.

FIG. 1 depicts at 30 a computer-implemented system that delivers images and data for display upon user computers 32. The user computers 32 can specifically request over a network 34 that content (e.g., web page 40) containing the images and data be provided to them. The content may be provided under other types of situations, such as in a content "push" situation.

The system 30 allows for content to contain image maps that have been generated from three dimensional object(s) 36. A three-dimensional object 36 may represent many different types of items, such as a three-dimensional version of a pie chart, geographical map or house.

Through use of information about a three dimensional object 36, an image map 38 is generated and provided to a user computer 32 via a server 42 having a data connection to the network 34. The image map 38 provides a list of coordinates relating to an image of a three-dimensional object 36, and defines one or more regions within the image.

The image map 38 contains information associated with a defined region. The information can be a hyperlink to another destination, mouse over tip information or other type information associated with the three-dimensional object 36. The created image map 38 allows a user to interact with a static image in, among other things, a web browser.

Figure 2:
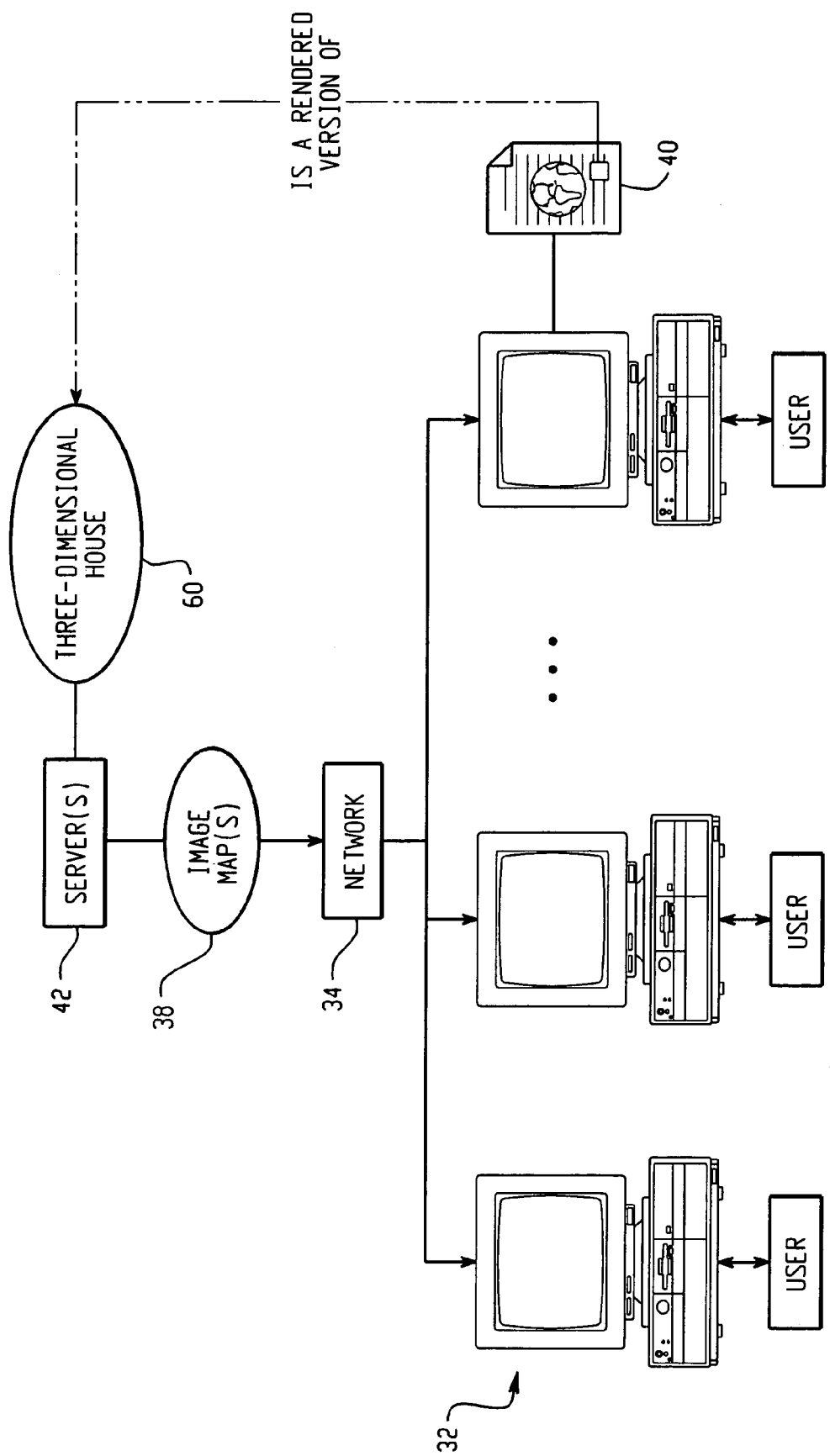
FIG. 2 is a block diagram involving a three-dimensional representation of a house.

An example is shown in FIG. 2 wherein a three-dimensional representation 60 of a house is used. Because an image map 62 has been created for the three-dimensional house object 60, a user viewing the house can click on a hyperlink associated with a room in the house and go to another web page that contains detailed information about that room, such as room floor dimensions. Still further a user can use a mouse to mouse over a particular room for viewing summary information for that room.

Figure 3:
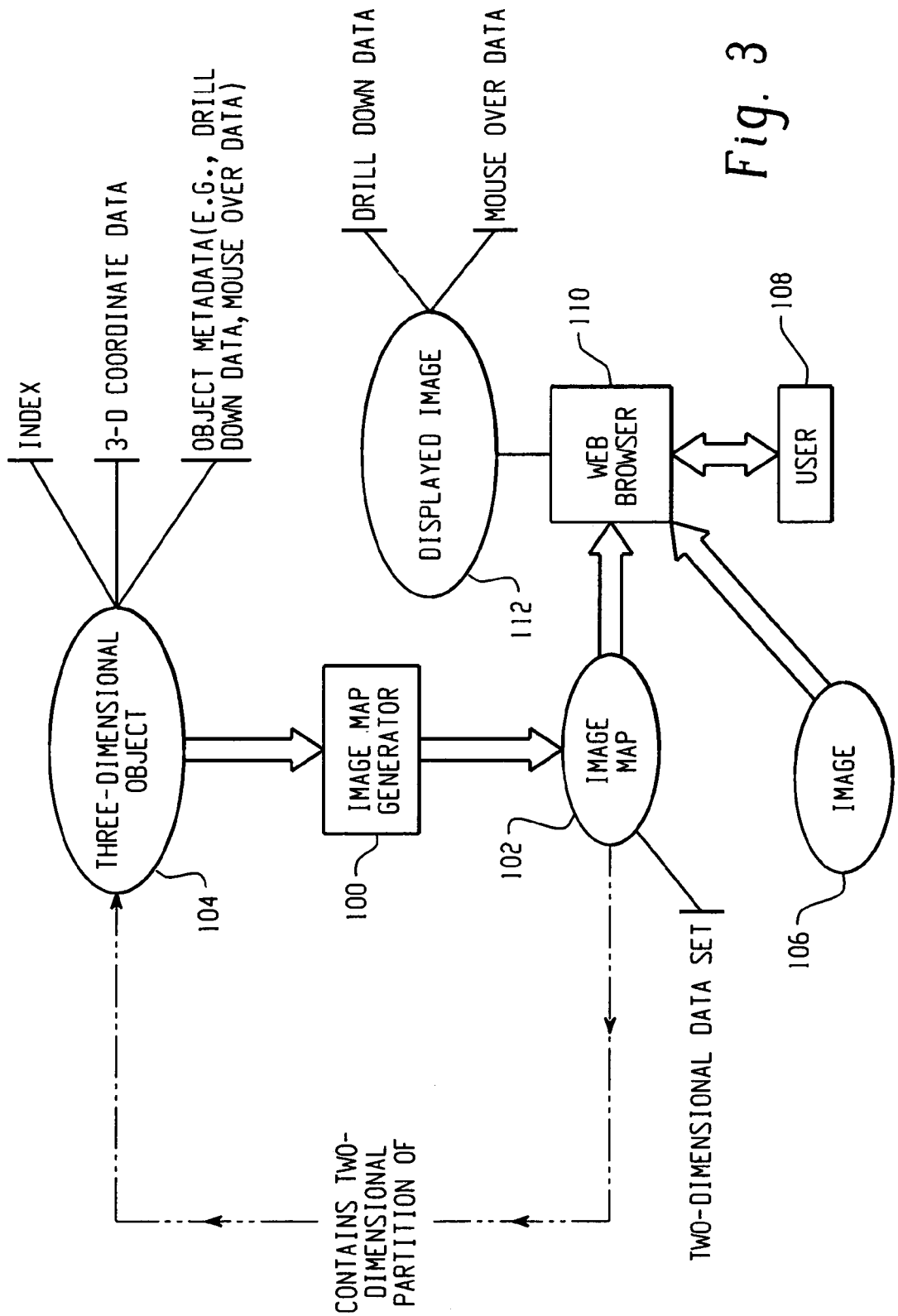
FIG. 3 is a block diagram depicting use of a generator software module for creating image maps from three dimensional objects.

FIG. 3 depicts a generator software module 100 for creating image maps 102 from three-dimensional objects 104. The image map generator 100 receives data about a three-dimensional object 104. The data may include three-dimensional coordinate data as well as object metadata, such as what drill down data and mouse over data is associated with the object 104. An index may also be provided that indicates which regions of the object are associated with which metadata.

The image map generator finds the two-dimensional projections of the object, and determines which object is closest to the viewer at points in the projection so as to determine the parts of the 3D objects that are visible in the intermediate and final images. The image map generator 100 produces a set of polygons which enclose the visible parts of each element or region in the object and associates the object metadata with the proper parts of the object. In this way, three-dimensional data stored in a data structure is translated into a two-dimensional image map.

The image map 102 and an image 106 representative of the three-dimensional object 104 are provided to a web browser 110 for display to the user 108. Because of the generated image map 102, the user 108 can interact with the displayed image 112, so as to be able to access hyperlinks for drilling down to view additional information and/or to be able to mouse over a region of the image 112 to view tips and other data associated with that region of the image 112.

Figure 4:
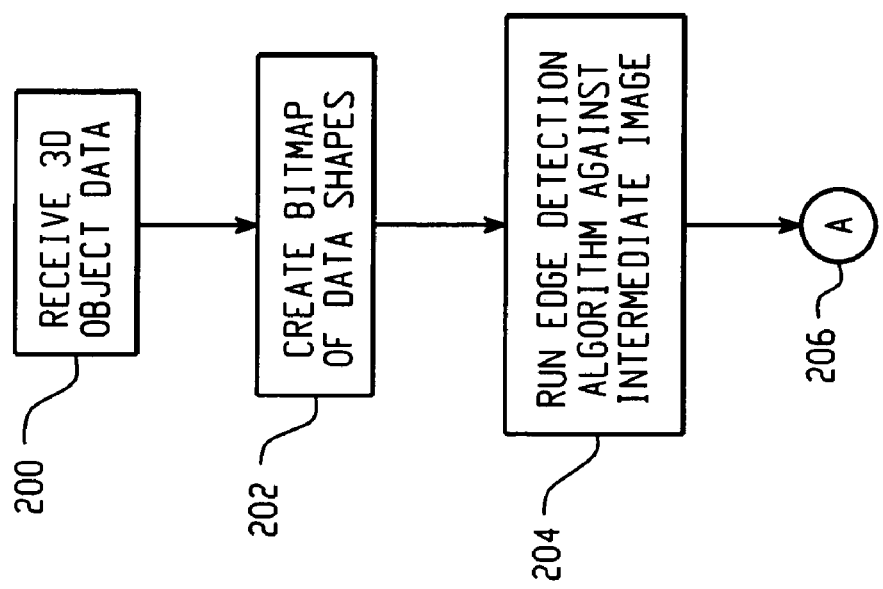
FIGS. 4 and 5 depict an operational scenario for generating an image map.
Figure 5:
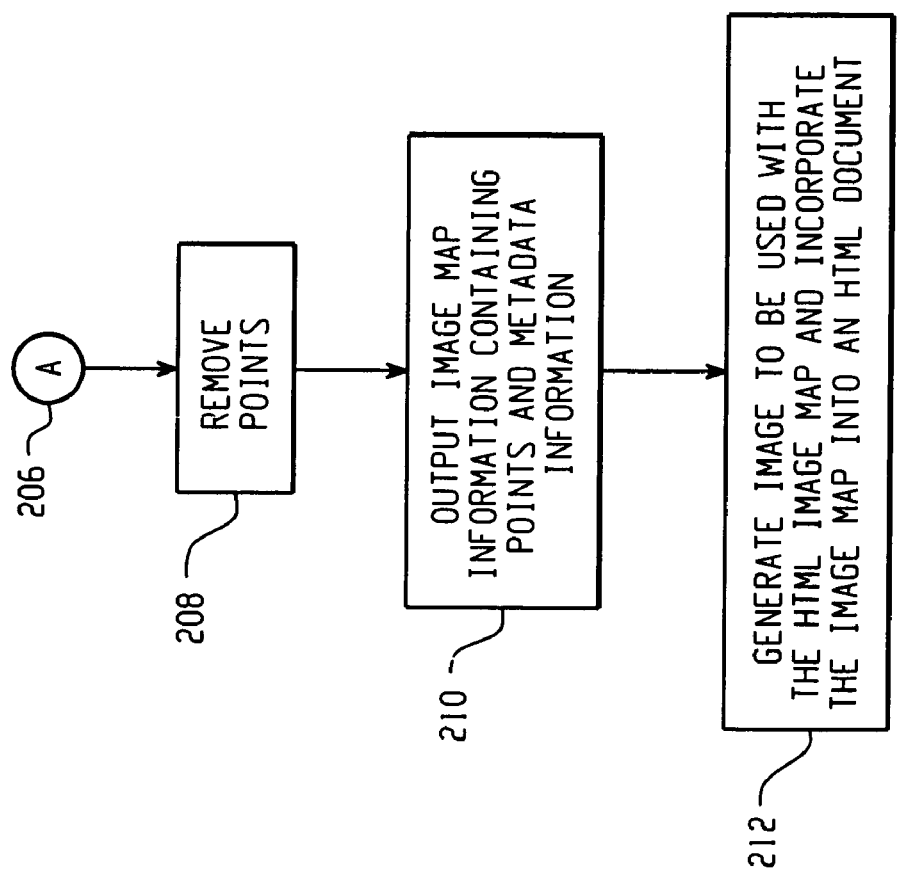

FIGS. 4 and 5 depict an operational scenario for generating an image map. With reference to FIG. 4, data about a three-dimensional object is received at step 200. Step 202 creates a non-shaded, color-coded bitmap of data shapes associated with the object. Step 204 runs an edge detection algorithm against this intermediate image in order to collect an array of points for the image map to be generated. Processing continues on FIG. 5 as indicated by continuation marker 206.

With reference to FIG. 5, step 208 culls the points down to a certain number. It should be understood that the number may be selected in order to enhance performance and that there are many methods to remove points from a polygon's shape. For example, an approach may be to remove every other point or every third point. Another approach may be to remove interstitial collinear points. In this example, the operation(s) for removal of points result in less than one hundred points per polygon shape.

Step 210 outputs the image map information containing the determined points and metadata information. Step 212 generates the image to be used with the image map and incorporates the image map into a Hypertext Markup Language (HTML) document for use by a user's web browser.

It should be understood that similar to the other processing flows described herein, the steps and the order of the steps may be altered, modified and/or augmented and still achieve the desired outcome. For example, step 202 may be modified so as to not use a bitmap image representation of the three-dimensional object. Instead other image representations may be used, such as a PNG format, etc. Moreover, it should be understood that a bitmap image does not have to be displayed in order for the image to be processed.

Figure 6:
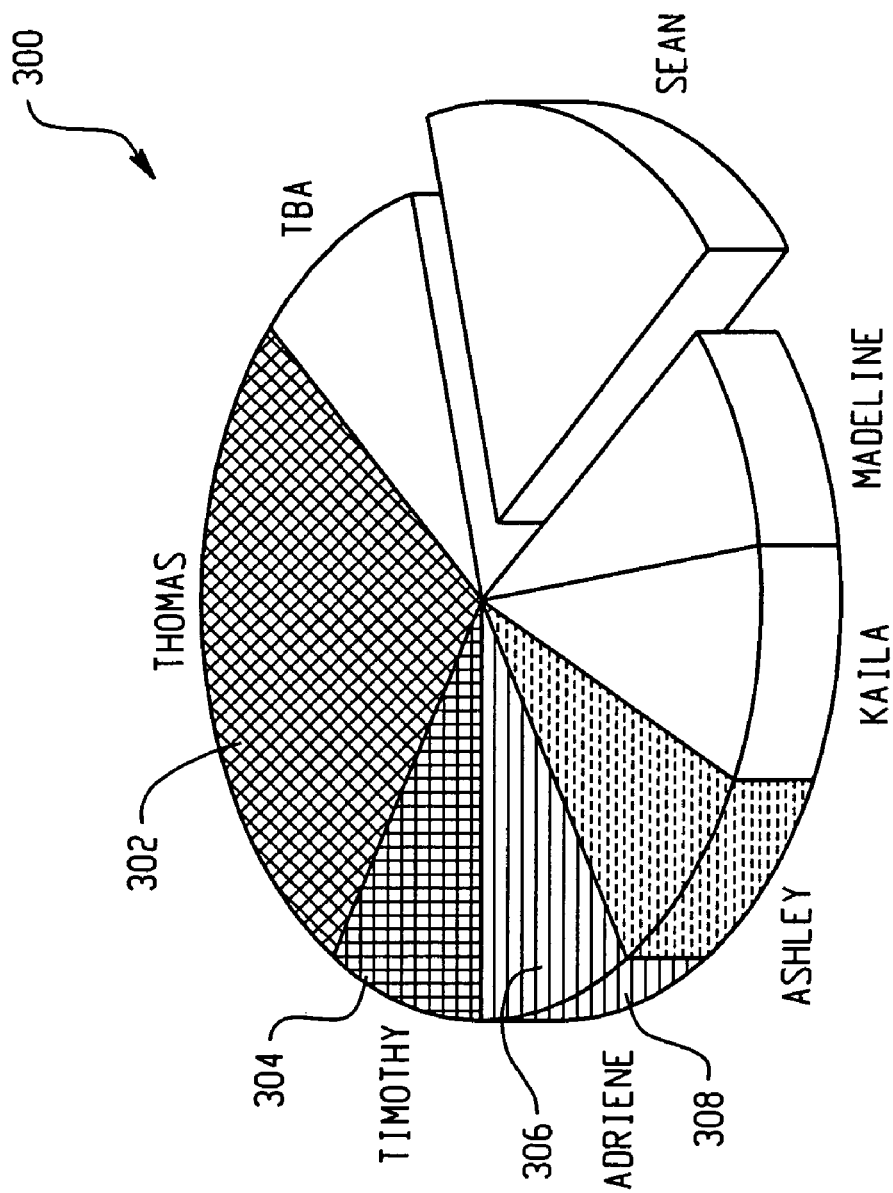

FIGS. 6-13 illustrate an operational scenario with respect to handling a three-dimensional pie chart. FIG. 6 depicts at 300 a three-dimensional pie chart object that is to be processed. The pie chart object 300 summarizes different children's and teenagers' contribution to a recycling project. The pie chart object 300 contains colorized pie wedges. For example, the "Thomas" pie wedge 302 has an orange color; the "Timothy" pie wedge 304 has a light yellow color; the "Adriene" pie wedge 306 has a "blue" color; etc. In this example, some of the pie wedges have shading, such as shown for the "Adriene" pie wedge 306 at 308.

Figure 7:
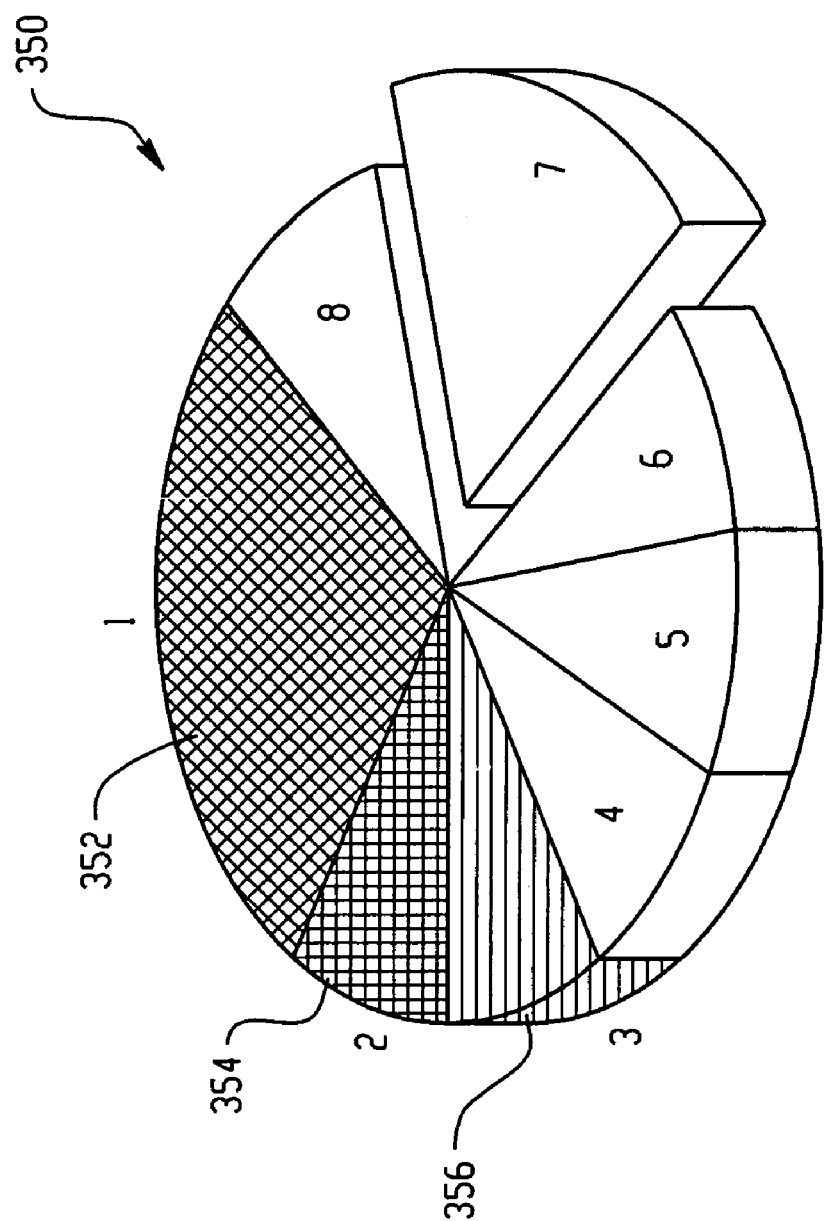

FIG. 7 depicts a bitmap version 350 of the pie chart object 300. The image of FIG. 7 is a non-shaded bitmap of the pie shapes associated with the pie chart object 300 of FIG. 6. The pie pieces may be color-coded with the metadata index values: for example, the "Thomas" pie piece 352 has an orange color, the "Timothy" pie wedge 354 has a light yellow color; and the entire "Adriene" pie wedge 356 has a "blue" color because the shading effect has been removed. The pie pieces could also have different gray-scales as shown in FIG. 7.

In this example, each pie piece is associated with a metadata index (e.g., a unique number that relates the data represented in the pie chart graph to its metadata as shown in FIG. 8). If the metadata index is used as the color, the elements can be rendered to a bitmap with a unique color for each desired element. This can be accomplished in a number of ways, such as by turning off settings (e.g., lighting and dithering) in the three-dimensional model/rendering system. The colors then remain unique for each chart element and blending does not occur which could possibly skew the color index. Color index skewing could result in incorrect data being matched to the wrong data elements. Non-essential elements do not have to be rendered since no image map would be needed for them. Non-essential elements include elements of the object that do not have metadata associated with it, such as the pie chart labels in this example. As can be seen in FIG. 7, this results in hidden surface removal.

As discussed above, an arbitrary unique number can be used as a metadata index number. FIG. 8 shows a metadata index number being associated with the data in the pie chart object. For example, the metadata index number "1" 380A (that is associated with the particular set of metadata for the "Thomas" pie element) is associated with the "Thomas" pie element data 380B. The "Thomas" pie element data 380B includes the underlying data that determines the size of the pie piece relative to the other data elements. The metadata index may be automatically generated by automatically assigning a number to a data element. As shown in FIG. 7, when the bitmap is rendered, the bitmap contains as the values in a data element's region in the bitmap the data element's assigned number.

After the bitmap is rendered, an edge detection routine is conducted. For example, a scan-line routine is used to collect the outline for each shape by isolating regions which contain only a single metadata index value. This is accomplished by beginning in the upper left hand corner of the image and then proceeding to the right across the image. If a color-coded metadata index approach is used, then if a pixel color does not match the background color or a color just collected, the code checks for the occurrence of this color in an array of collected colors. If the color is found in the array, a check is done to see if the point has already been recorded. If the point has been collected, the scan continues across the image to the right until a new color is found (not including the background color). If the point is not found in a previously recorded shape or the color is not found, the color is added to the array of collected colors and the shape is then traced and the outline of the color is collected. The results of this step can be seen in FIG. 9.

Figure 9:
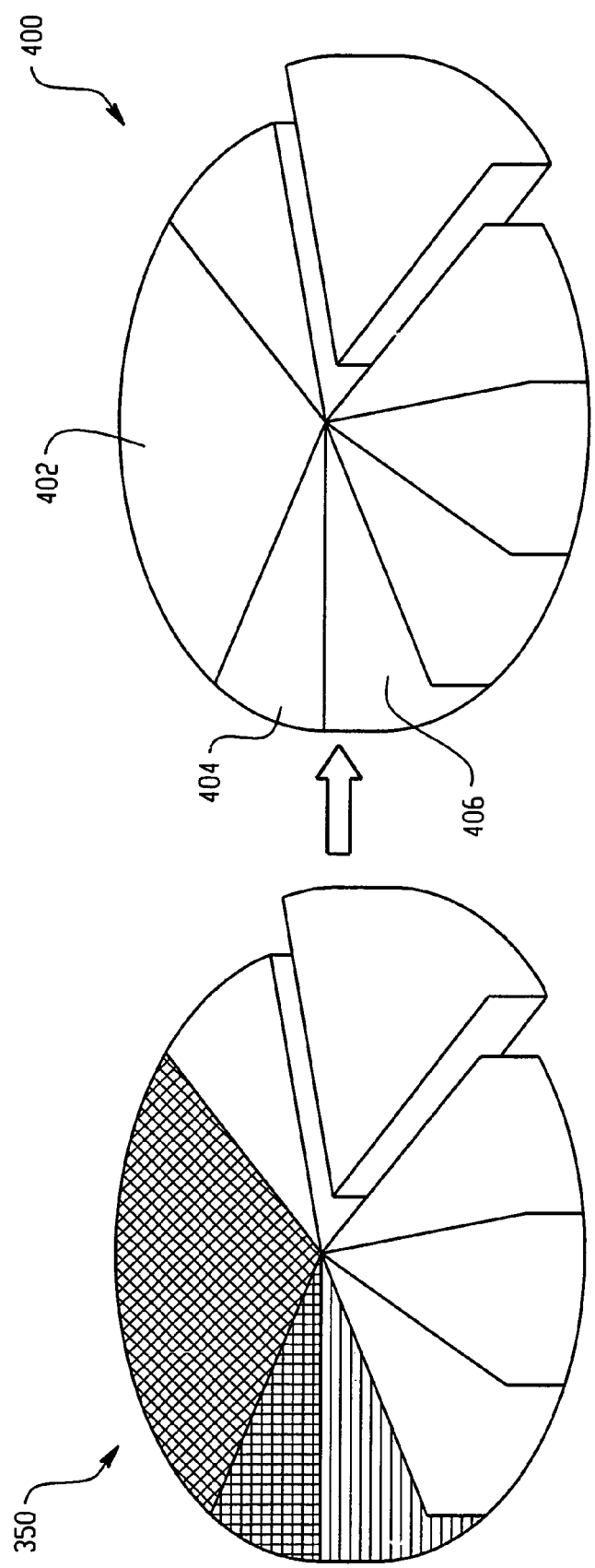
Figure 10:
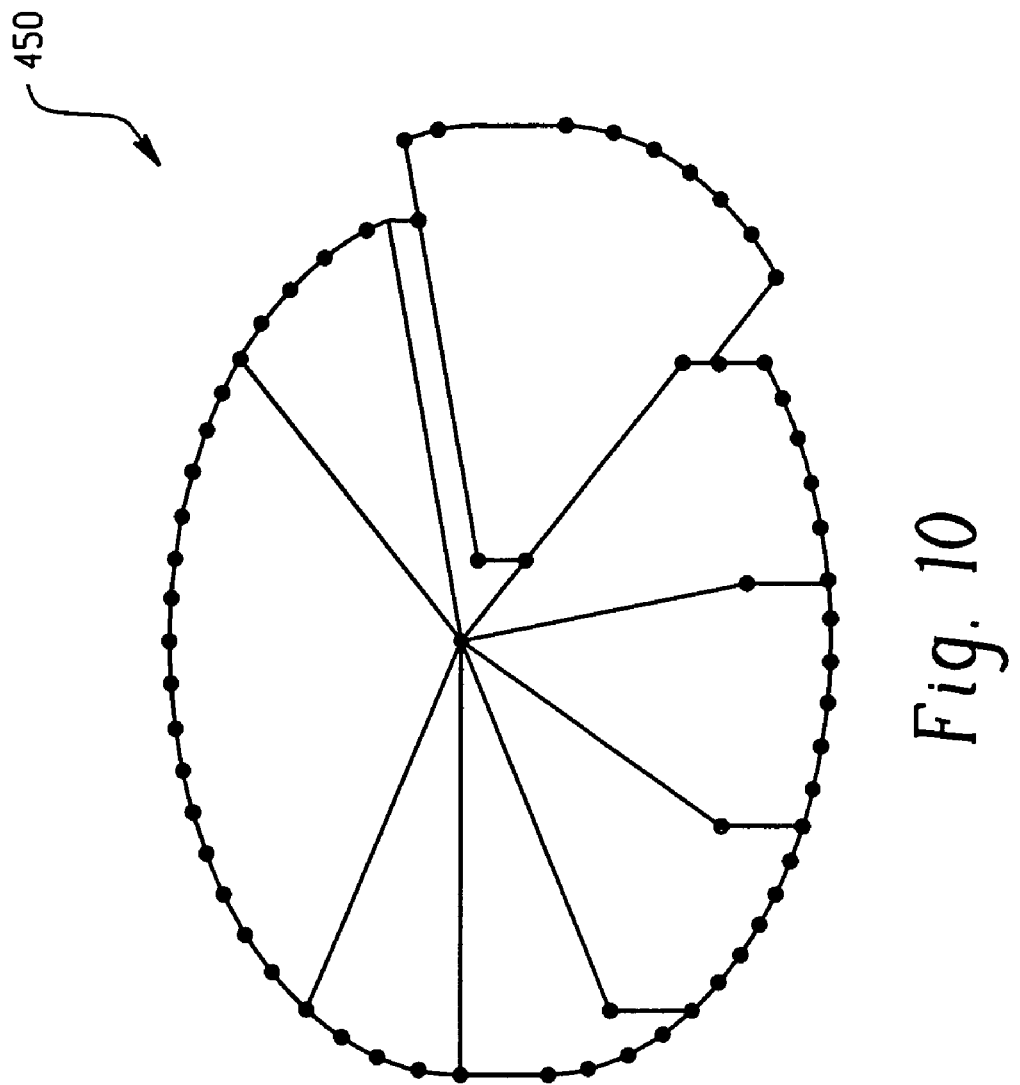

FIG. 9 shows at 400 the outline of the visible pie elements determined from the image 350. As an illustration, the outline of the "Thomas" piece is shown at 402; the outline of the "Timothy" piece is shown at 404; the outline of the "Adriene" piece is shown at 406; etc.

After the shapes are collected, one or more algorithms can be used to remove excess points from the image map to bring the total number per shape to below a particular number of points (e.g., one hundred points per polygon shape) for performance or implementation reasons. Simple point dropping can be applied first. Then horizontal/vertical and collinear checks can be applied to reduce the number of points per shape further. The results of this step can be seen at 450 in FIG. 10.

Once the shapes are culled down to one hundred or less points, metadata is assigned to each shape through the shape's metadata index in the bitmap as shown in the table of FIG. 11. For example, the "Thomas" boundary data is associated with metadata index "1" which is associated with name and age metadata information. (This metadata information can be displayed to a user if the user performs a mouse over the "Thomas" pie piece.) Additional data that can utilized by a user in a web browser would be a hyperlink associated with the "Thomas" pie piece. When the user clicks upon the "Thomas" hyperlink, the user can be taken to a different web page.

Based upon the metadata index and the determined boundaries, an image map is created with the appropriate HTML code to represent the shapes of the image in question. Below shows sample portions of the HTML produced for the current pie chart example for the data tips:

```
<area shape=poly alt="Name:    Thomas
Age:      19 (22.35%)" title="Name:     Thomas
Age:      19 (22.35%)" href="http://www.enf.org/"
coords="319,219,307,211,295,202,283,193,271,185,259,176,247,168,235,159,223,150,211,142,
199,133,187,125,175,116,186,109,198,104,210,99,222,95,234,91,246,88,258,85,270,83,282,82,294,
```

-continued

```
81,342,80,348,81,354,82,360,82,372,84,384,86,396,89,408,92,420,95,432,100,444,105,454,111,
442,121,436,126,430,131,418,140,406,150,394,160,382,169,370,179,358,189,346,198,334,208,
322,218,">
    <area shape=poly alt="Name:       Timothy
    Age:         9 (10.59%)" title="Name:         Timothy
    Age:         9 (10.59%)" href="http://www.internaldrive.com/"
coords="310,219,298,217,286,216,274,214,262,213,250,212,238,210,226,209,214,208,202,206,
190,205,178,204,166,202,154,201,142,200,130,198,118,197,106,195,109,183,115,171,123,159,133,
147,145,136,157,127,169,119,180,121,192,129,204,138,216,146,228,155,240,164,252,172,264,
181,276,189,282,194,288,198,300,207,312,215,312,219,">
    <area shape=poly alt="Name:       TBA
    Age:         7 (8.24%)" title="Name:         TBA
    Age:         7 (8.24%)" href="http://www.guardup.com/camp.htm"
coords="362,240,350,234,338,228,326,222,328,214,340,204,346,199,352,194,364,185,376,175,
388,165,400,156,412,146,424,136,436,127,448,117,460,113,472,120,484,128,496,138,507,149,517,
161,522,173,519,182,513,184,507,185,495,189,483,192,471,195,459,198,447,201,435,204,423,
207,411,210,399,213,387,216,375,219,363,222,362,234,">
    Etc.
```

Any attribute of the HTML map element could be used to describe in some way the shapes that have been collected (e.g., 'alt', 'title', and 'href'). The image map in this example links various parts of an image without resorting to dividing the image itself into separate parts.

When the image map file is written out and the full image with all lighting and shading is produced, a post-processing step incorporates the full image and image map HTML code into an HTML document.

Figure 12:
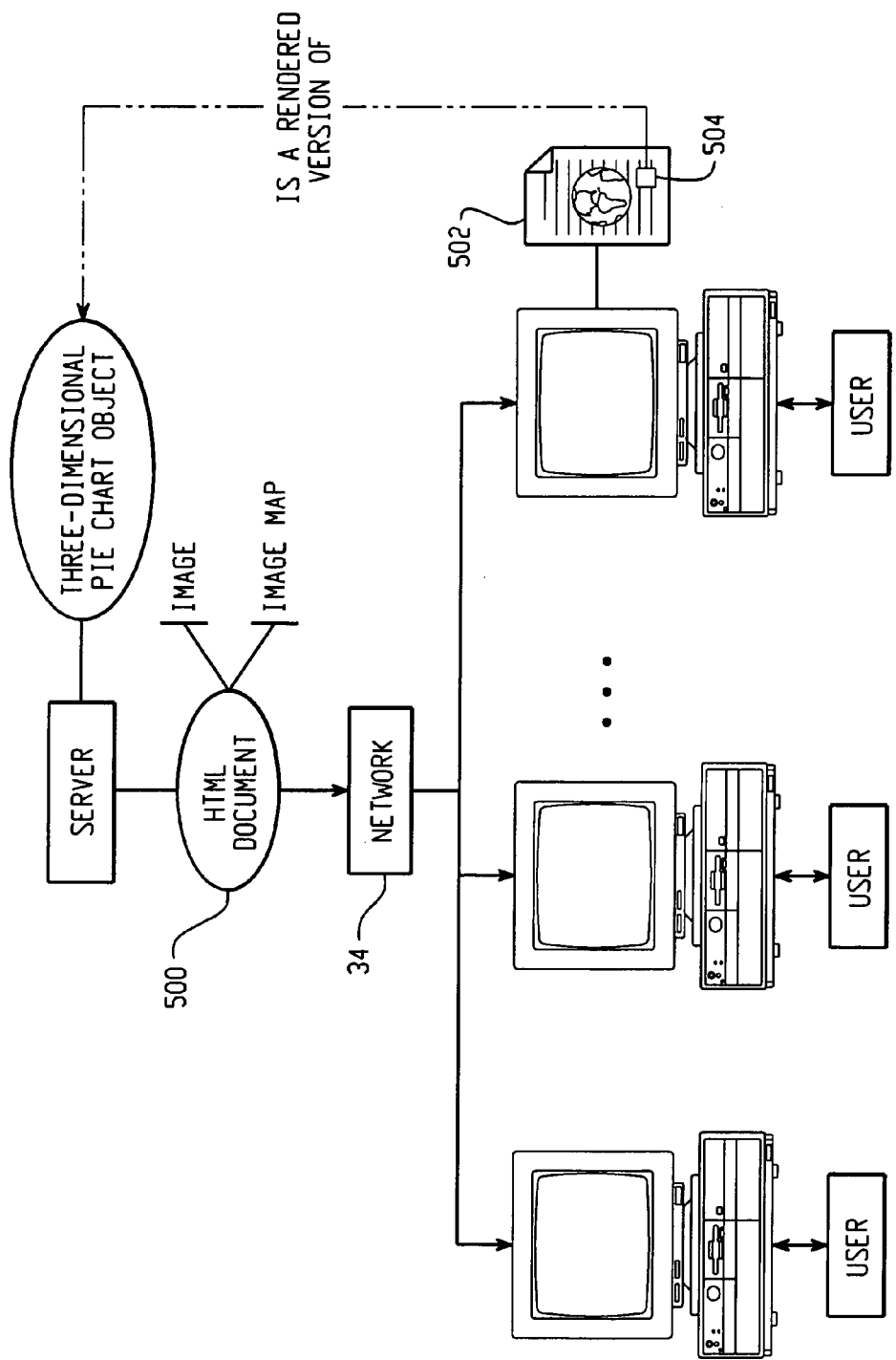

As shown in FIG. 12, the HTML document 500 is delivered over a network 34 for end-user viewing. The HTML document 500 is viewed as a web page 502, and the full image is included in the displayed web page 502. A full image may be in many different formats, such as any format a browser can display and can show the colors and shading and other visual aspects of an image.

Figure 13:
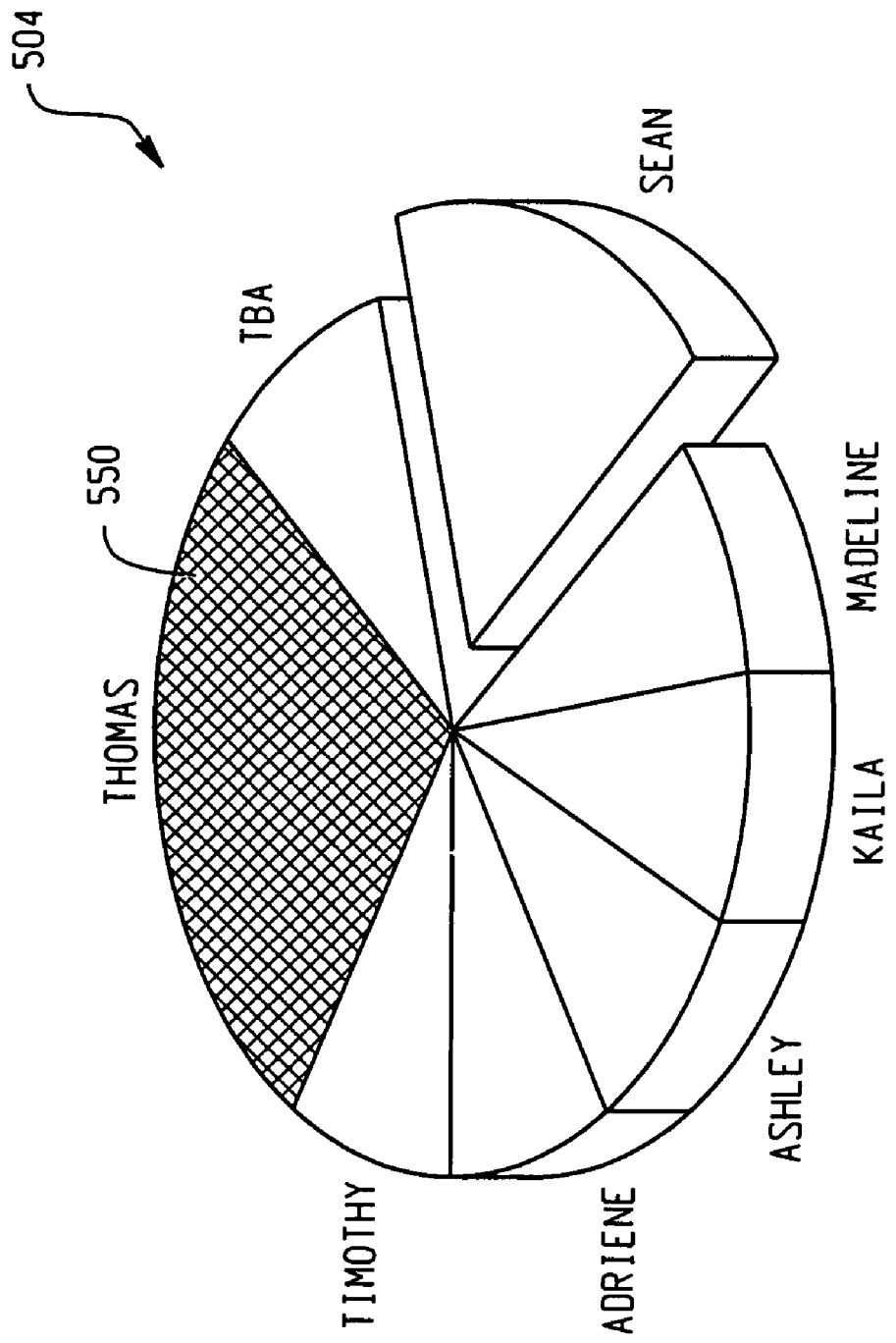

FIG. 13 shows the displayed colorized HTML content containing the image 504. The user is capable of using the hyperlinks associated with the different pieces of the pie chart. The user can also mouse over a pie piece to view additional information associated with the pie piece. As an illustration, a user can mouse over the displayed orange "Thomas" pie piece 550, and see associated tip information. The user can also click within the region of the pie piece 550 and go to another location.

Figure 14:
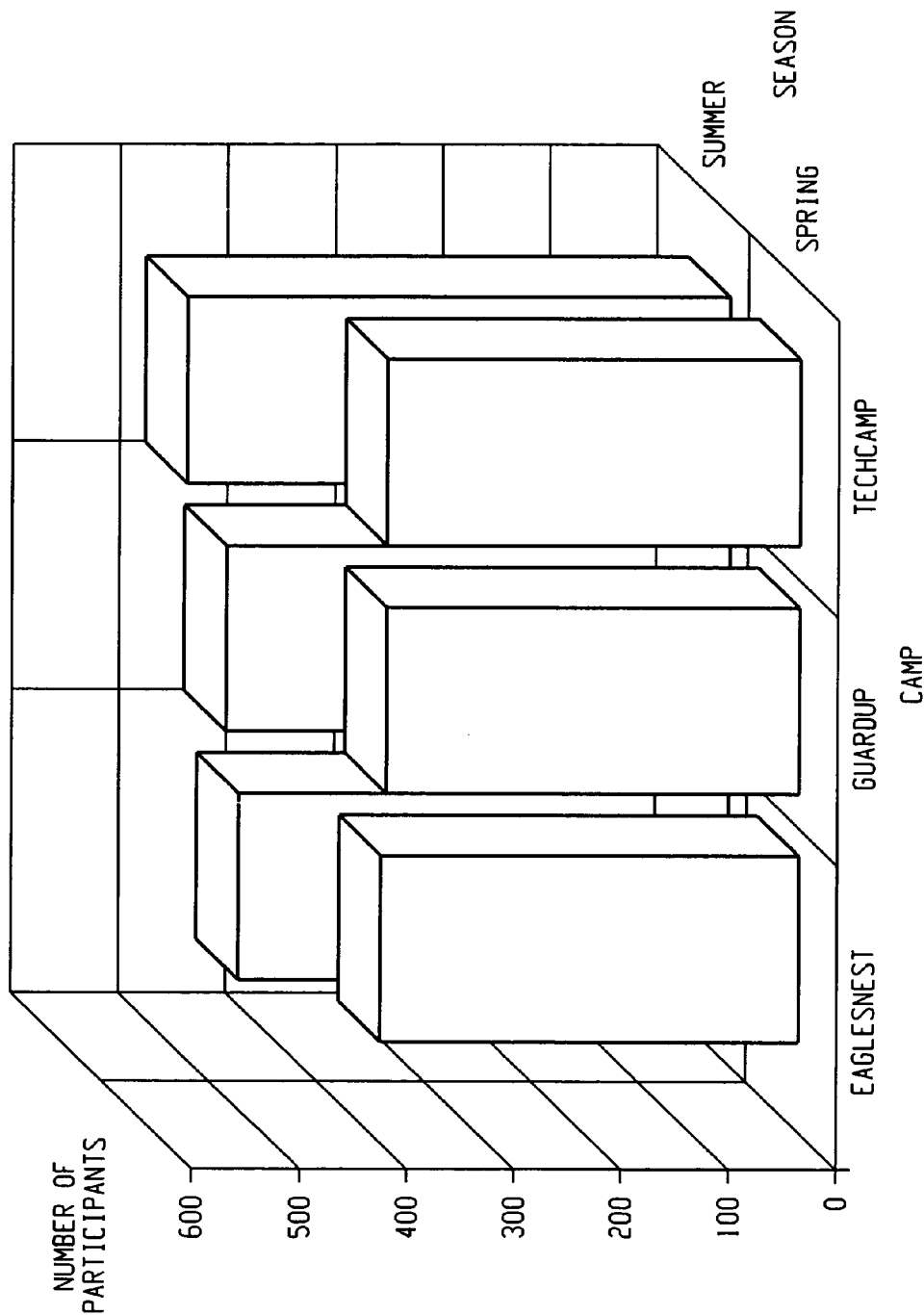
FIGS. 14-17 depict an operational scenario with respect to handling a three-dimensional bar graph.

While examples have been used to disclose the invention, including the best mode, and also to enable a person skilled in the art to make and use the invention, the patentable scope of the invention is defined by claims, and may include other examples that occur to those skilled in the art. For example, it should be understood that many different three-dimensional objects can be used with the disclosed systems and methods. As an illustration, FIGS. 14-17 depict the handling of a three-dimensional bar graph. FIG. 14 depicts the three-dimensional bar graph object that is to be processed. The three-dimensional representations of the graph object may resemble:

BAR1 Height 35 Width 10 Depth 10 anchor point (−2, 0, 1).

BAR2 Height 33 Width 10 Depth 10 anchor point (0, 0, 1).

BAR3 Height 34 Width 10 Depth 10 anchor point (2, 0, 1).

BAR4 Height 42 Width 10 Depth 10 anchor point (−2, 0, −1.)

BAR5 Height 43 Width 10 Depth 10 anchor point (0, 0, −1).

BAR6 Height 45 Width 10 Depth 10 anchor point (2, 0, −1).

Figure 15:
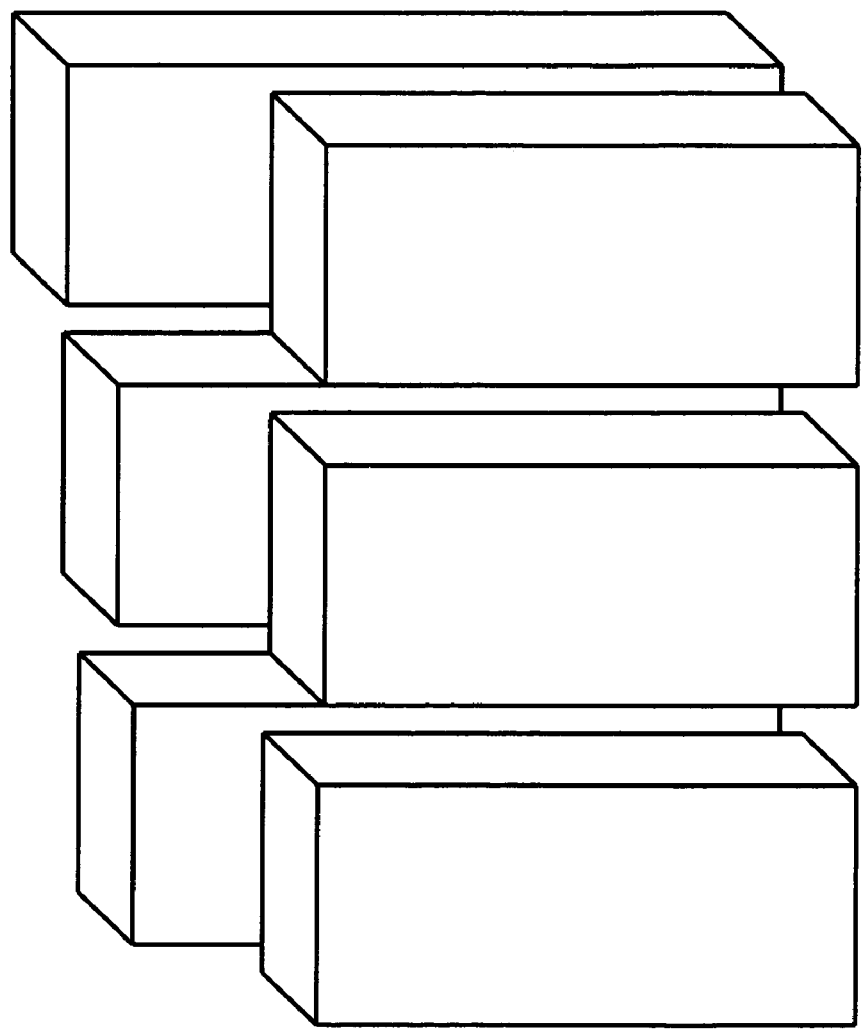

FIG. 15 depicts creating a bitmap of the shapes in the bar graph object. In FIG. 14, the shapes in the bar graph object have the same color, but each data element in the bar graph object is assigned a unique metadata index value as seen in FIG. 15.

Figure 16:
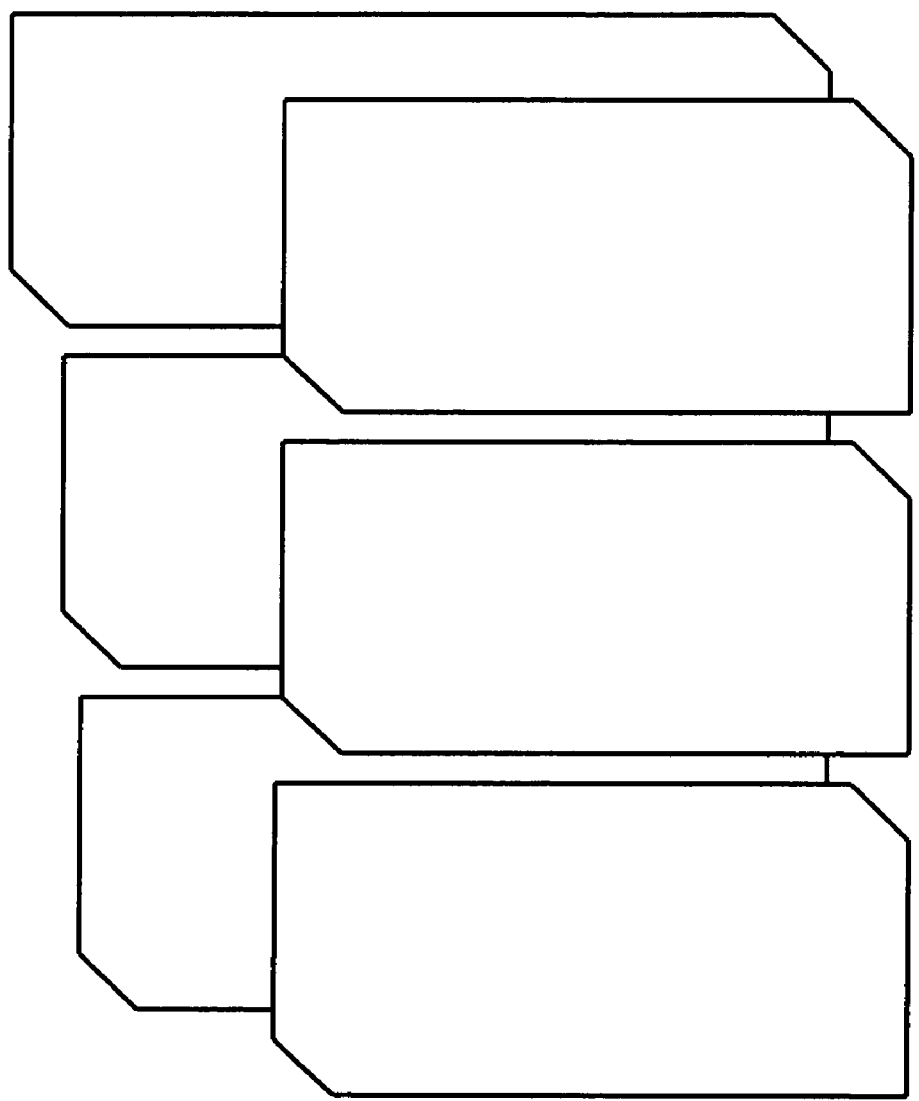
Figure 17:
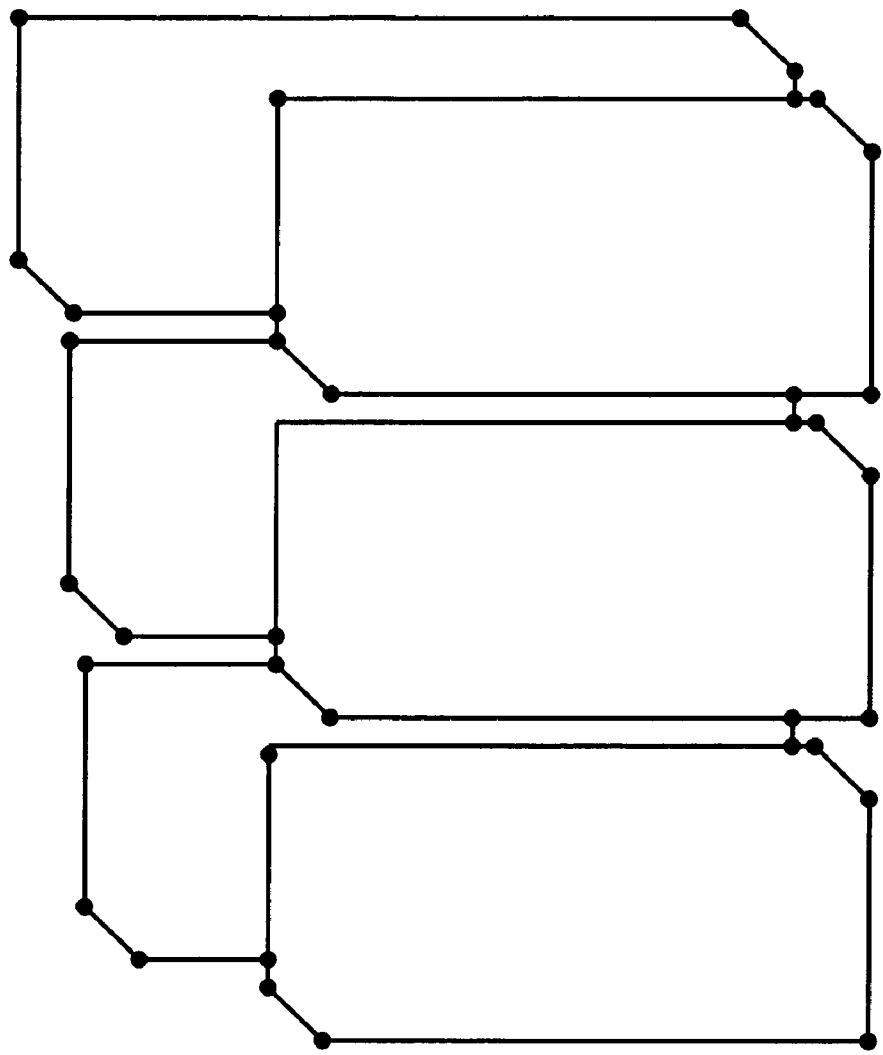

FIG. 16 depicts the bar graph items after an edge detection algorithm has been used to determine the visible boundaries of the items. FIG. 17 depicts the bar graph items after the array of points has been culled down below a threshold level. An image map produced for the bar chart may resemble:

```
<map name="MW4CEB2O">
    <area shape=poly alt="Camp:       TechCamp
    Number of Participants:         507
    Season:      summer" title="Camp:         TechCamp
    Number of Participants:         507
    Season:      summer"            href="http://www.internaldrive.com/"
coords="470,387,470,201,465,199,393,199,390,196,390,124,402,112,414,105,498,105,502,107,
502,365,499,371,487,383,481,387,475,387,">
    <area shape=poly alt="Camp:       GuardUp
    Number of Participants:         474
    Season:      summer" title="Camp:         GuardUp
    Number of Participants:         474
    Season:      summer"            href="http://www.guardup.com/camp.htm"
coords="347,387,347,207,344,203,272,203,268,201,268,141,280,129,292,122,376,122,379,125,
379,197,369,206,357,218,352,387,">
```

-continued

```
    <area shape=poly alt="Camp:      EaglesNest
    Number of Participants:      463
    Season:      summer" title="Camp:      EaglesNest
    Number of Participants:      463
    Season:      summer" href="http://www.enf.org/"
coords="224,387,224,201,146,200,145,195,145,147,157,135,169,127,253,127,256,130,256,202,
245,212,234,224,234,386,229,387,">
    <area shape=poly alt="Camp:      TechCamp
    Number of Participants:      387
    Season:      spring" title="Camp:      TechCamp
    Number of Participants:      387
    Season:      spring"      href="http://www.internaldrive.com/"
coords="358,420,358,222,360,216,372,204,378,200,468,200,469,205,469,397,467,403,455,415,
359,420,">
    Etc.
```

Figure 18:
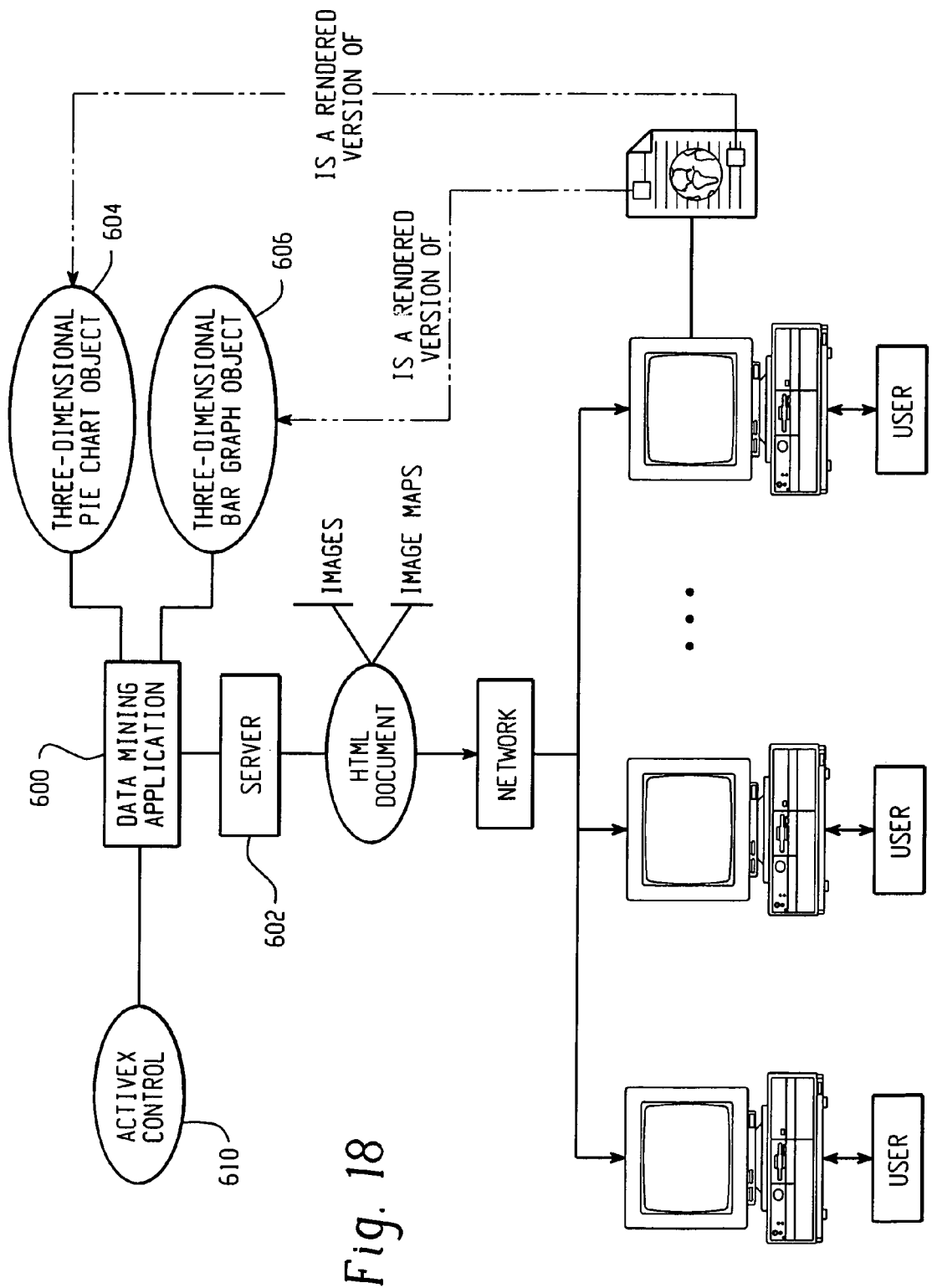
FIG. 18 is a block diagram illustrating use of image maps with a data mining application.

FIG. 18 illustrates still further the wide scope of the systems and methods. With reference to FIG. 18, a data mining application 600 operates on a server 602. The data mining application 600 analyzes data using statistical modeling and generates, among other things, three-dimensional graphical representations of analytical results (e.g., three-dimensional pie chart object 604 and three-dimensional bar graph object 606). The three-dimensional graphical results can be provided through a live ActiveX control 610. However, it may not be desirable to utilize the ActiveX control 610 with respect to one or more users. For example, users accessing the data mining application 600 may be using platforms different than a Windows-based platform. Such platforms may be incapable of utilizing or properly handling the live ActiveX control 610 for rendering a three-dimensional representation of the analytical results. Additionally, the data mining application 600 may have been providing images to users by saving only a two-dimensional version of the image via the ActiveX control 610 and in the process losing useful information (such as mouse over data tips and drill down capability). To preserve such information, a user can select that the results be provided in an HTML format. Under that option, an image map would be generated and provided for use in displaying the graphical representation of the analytical results. Accordingly, this additional information is made available to end users including those that did not have such an ActiveX control 610 installed.

In addition to the wide variety of objects that can be handled by the systems and methods disclosed herein, it is further noted that the systems and methods may be implemented on various types of computer architectures, such as for example on a networked system, or in a client-server configuration, or in an application service provider configuration. In multiple computer systems, data signals may be conveyed via networks (e.g., local area network, wide area network, internet, etc.), fiber optic medium, carrier waves, wireless networks, etc. for communication among multiple computers or computing devices.

The systems' and methods' data may be stored as one or more data structures in computer memory and/or storage depending upon the application at hand. The data structure disclosed herein describe formats for use in storing data on computer-readable media or use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

It is claimed as the invention:

1. A computer-implemented method for use in displaying an image representative of a three-dimensional object, comprising the steps of:

receiving metadata and shape data related to a three-dimensional object;

wherein the shape data defines the three-dimensional object in a three-dimensional coordinate format;

wherein the metadata is associated with the three-dimensional object;

defining a region of the object using a two dimensional format;

wherein the defined region is associated with at least a portion of the metadata;

wherein the defined region allows a user to access metadata associated with an image being displayed to a user;

defining additional regions of the object using a two-dimensional coordinate format;

displaying the defined region and the additional regions to the user;

wherein collectively the displayed defined region and the additional regions are substantially a visual duplicate of the object.

2. The method of claim 1, wherein the shape data include geometric coordinates detailing the contours of the three-dimensional object.

3. The method of claim 1, wherein the metadata includes data regarding drill down information.

4. The method of claim 1, wherein the metadata includes mouse over textual data.

5. The method of claim 1, wherein an index associates what metadata relates to what portions of the three-dimensional object.

6. The method of claim 1, wherein markup language instructions are generated to define the region;
wherein the generated markup language instructions include Hypertext Markup Language (HTML) instructions.

7. The method of claim 1, wherein markup language instructions are generated to define the region;
wherein the generated markup language instructions include instructions on how to display the image;
wherein the generated markup language instructions define a plurality of regions for the object by specifying two-dimensional coordinates that indicate boundaries of the regions.

8. The method of claim 1, wherein markup language instructions are generated to define the region;
wherein the displayed image is operable, because of the generated markup language instructions, to allow a user to utilize a hyperlink associated with the displayed image.

9. The method of claim 1, wherein markup language instructions are generated to define the region;
wherein the displayed image is operable, because of the generated markup language instructions, to allow a user to utilize hyperlinks associated with different portions of the displayed image.

10. The method of claim 1, wherein markup language instructions are generated to define the region;
wherein the displayed image is operable, because of the generated markup language instructions, to allow a user to view mouse over text associated with the displayed image.

11. The method of claim 1, wherein markup language instructions are generated to define the region;
wherein the displayed image is operable, because of the generated markup language instructions, to allow a user to view mouse over text associated with different portions of the displayed image.

12. The method of claim 1, further comprising the steps of:
using a bitmap image of the three-dimensional object to detect boundaries associated with regions within the bitmap image;
wherein the detected boundaries identify regions that are associated with the metadata;
wherein an array of points define the boundaries;
creating an image map from the array of points;
generating the markup language instructions based upon the image map.

13. The method of claim 12, further comprising the step of:
reducing the number of points that define the boundaries before creating the image map.

14. The method of claim 12, further comprising the step of:
creating a non-shaded, color-coded bitmap image of elements that appear within the three-dimensional object for use in detecting the boundaries.

15. The method of claim 12, wherein the image map is incorporated into an HTML document for delivery to a user computer; wherein the HTML document references an image representative of the three-dimensional object;
wherein a user is able to access metadata for the image being displayed on a user interface because of the image map.

16. The method of claim 1, wherein an applet computer program includes data related to the defined region and is used by a user to access metadata associated with the image being displayed to the user.

17. A computer-implemented apparatus for use in displaying on a user interface an image that is representative of a three-dimensional object, comprising:
a data structure tat stores metadata and shape data associated with the three-dimensional object, wherein the shape data defines the three-dimensional object in a three-dimensional coordinate format;
wherein the metadata is associated with the three-dimensional object;
an image map generator that defines a region of the object using a two dimensional format;
wherein the defined region has an association with at least a portion of the metadata;
wherein the defined regions allows a user to access the metadata associated with an image displayed on the user interface;
wherein the image map generator defines additional regions of the object using a two-dimensional coordinate format;
wherein the defined region and the additional regions are displayed to the user;
wherein collectively the displayed defined regions and the additional regions are substantially a visual duplicate of the object when displayed on the user interface.

18. A computer-implemented apparatus for providing a three-dimensional object for display on a user interface, comprising:
means for receiving metadata and shape data related to a three-dimensional object;
wherein the shape data defines the three-dimensional object in a three-dimensional coordinate format;
wherein the metadata is associated with the three-dimensional object;
means for generating markup language instructions that define a region of the object using a two dimensional coordinate format;
wherein the defined region is associated with at least a portion of the metadata;
means for generating markup language instructions that define additional regions of the object using a two-dimensional coordinate format;
means for displaying the defined region and the additional regions to the user;
wherein the generated markup language instructions allow a user to access metadata associated with an image being displayed to a user;
wherein collectively the displayed defined region and the additional regions are substantially a visual duplicate of the object.

19. The apparatus of claim 17, wherein the shape data include geometric coordinates detailing the contours of the three-dimensional object.

20. The apparatus of claim 17, wherein the metadata includes data regarding drill down information.

21. The apparatus of claim 17, wherein the metadata includes mouse over textual data.

22. The apparatus of claim 17, wherein an index associates what metadata relates to what portions of the three-dimensional object.

23. The apparatus of claim 17, wherein markup language instructions are generated to define the region;
   wherein the generated markup language instructions include Hypertext Markup Language (HTML) instructions.

24. The method of claim 1, wherein the image being displayed to the user is a two-dimensional image.

25. A computer-readable storage medium encoded with instructions that cause a computer to perform a method for use in displaying an image representative of a three-dimensional object, said method comprising the steps of:
   receiving metadata and shape data related to a three-dimensional object;
   wherein the shape data defines the three-dimensional object in a three-dimensional coordinate format;
   wherein the metadata is associated with the three-dimensional object;
   defining a region of the object using a two dimensional format;
   wherein the defined region is associated with at least a portion of the metadata;
   wherein the defined region allows a user to access metadata associated with an image being displayed to a user;
   defining additional regions of the object using a two-dimensional coordinate format;
   displaying the defined region and the additional regions to the user;
   wherein collectively the displayed defined region and the additional regions are substantially a visual duplicate of the object.

* * * * *

UNITED STATES PATENT AND TRADEMARK OFFICE
CERTIFICATE OF CORRECTION

PATENT NO.       : 7,352,368 B2                                Page 1 of 1
APPLICATION NO.  : 10/837811
DATED            : April 1, 2008
INVENTOR(S)      : Frazelle et al.

It is certified that error appears in the above-identified patent and that said Letters Patent is hereby corrected as shown below:

In Column 10, line 18, Claim 17 delete "tat" and insert -- that --.

Signed and Sealed this

Twenty-fourth Day of June, 2008

JON W. DUDAS
*Director of the United States Patent and Trademark Office*